United States Patent
Bachmat et al.

(10) Patent No.: US 6,775,739 B1
(45) Date of Patent: Aug. 10, 2004

(54) MIRRORED DRIVE PERFORMANCE USING MATCHING ALGORITHMS

(75) Inventors: Eitan Bachmat, Hopkinton, MA (US); Dan Arnon, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/058,590

(22) Filed: Apr. 10, 1998

(51) Int. Cl.[7] .............................................. G06F 12/16
(52) U.S. Cl. ...................................................... 711/114
(58) Field of Search ................................. 709/100, 102, 709/103–105; 714/6; 711/150, 151, 158, 153, 112, 113, 114, 170, 162, 161

(56) References Cited

U.S. PATENT DOCUMENTS

| | | | | |
|---|---|---|---|---|
| 5,819,310 A | * | 10/1998 | Vishlitzky et al. ........... | 711/114 |
| 5,835,938 A | * | 11/1998 | Yamamoto et al. .......... | 711/112 |
| 5,937,428 A | * | 8/1999 | Jantz ............................ | 711/114 |
| 6,112,257 A | * | 8/2000 | Mason et al. ................. | 710/18 |
| 6,173,306 B1 | * | 1/2001 | Raz et al. ..................... | 709/102 |

OTHER PUBLICATIONS

Chen et al., "Performance of a Mirrored Disk in a Real–Time Transaction System," University of Massachusetts publication No. XP–000989675, 1991.

Golubchik et al. "Load Balancing and Robustness to Skew and Failures," University of California publication No. XP–002141666, 1992.

* cited by examiner

*Primary Examiner*—Matthew Kim
*Assistant Examiner*—Woo H. Choi
(74) *Attorney, Agent, or Firm*—Hale and Dorr LLP

(57) ABSTRACT

The invention relates generally to mass storage systems, and in particular to mass storage systems in which stored logical volumes are duplicated in mirrored form. The system includes a method for dynamically maximizing separation of said logical volumes by adjusting the mirror service policy for a disk drive system. Statistics are periodically collected describing the reading and writing of data to mirrored logical volumes of the system in successive time periods and, from time to time, based upon the collected statistics, activity levels for the logical volumes are determined. A matching algorithm, weighted or unweighted, maximizes separation of the logical volumes and minimizes average physical drive seek times. In particular, the system takes into account activity levels at the physical devices and results in more efficient accessing of logical volume pairs as well as a better balance or loading of logical volumes.

30 Claims, 4 Drawing Sheets

MIRRORED DRIVE PERFORMANCE USING MATCHING ALGORITHMS

BACKGROUND OF THE INVENTION

The invention relates generally to mass storage systems, and in particular, to mass storage systems in which stored logical volumes are duplicated in mirrored form.

Mass storage systems have grown significantly in capacity over the past years while maintaining a lower cost per stored byte. Accordingly, various methods and systems have been developed for increasing the reliability of the systems and to protect against failures. One such policy includes the storage of two or more copies of the data in what are called mirrored drives. This system operates to maintain all copies up to date. Most typically, there are two copies.

In a typical system, each physical drive is often divided into a plurality of units, one unit often being a logical volume. Under these circumstances, each logical volume appears to the host computer or computers to be a separate drive and operations take place with regard to the logical volume as if it were a physical volume. Some logical volumes are accessed substantially more often for read and/or write operations, and the nature of the operations can vary from random accesses to sequential accesses during any particular sequence of read or write operations. As a result, with larger disk drives, the risk of having concurrent jobs, each pertaining to a relatively small file (local activity) interfering with each others' disk activity increases. The use of striping techniques further increases the risk. Depending upon the nature and variety of the read and write operations to a physical drive containing many logical volumes, the disk read/write heads may be severely worked and the access time can, on average, be increased if sequential read and write locations are not located near one another.

One method for combating such problems is to set a mirror service policy, statically or preferably dynamically (as described in U.S. Ser. No. 08/936,122, filed Sep. 24, 1997, now U.S. Pat. No. 6,112,257, issued Aug. 29, 2000 and entitled Dynamic Mirror Service Policy, the contents of which are incorporated herein, by reference), which attempts to optimize the reading and writing of data. Such a policy may, for example, assume that most data transfers are sequential in nature, or that they are random. The policies can include, for example, interleaved, mixed, dedicated, or other policies which appear, after reviewing the manner in which a drive is, or is to be, used, to provide the best average access time to the data.

One such policy is to only service requests that fall within the first half of a logical volume. Another policy might be to only service requests that fall in odd groups with a group being defined in terms of a number of blocks. For instance the first group (blocks 0–959) will be serviced by copy 1 and the next group by copy 2, etc. These policies, when implemented statically, are limited because the policies are chosen at system configuration time and never change. A dynamic mirror policy can substantially improve performance as the policies for the system change periodically, for example, every ten minutes. But even with a dynamically changing mirror policy, it is still important to select the correct (best) policy for each logical volume.

SUMMARY OF THE INVENTION

The invention relates to a method and apparatus for dynamically adjusting the loading in a system of physical disk drives for reading mirrored logical volumes. The method features the steps of collecting statistics describing at least reading data from the mirrored volumes during successive time periods, determining from the statistics an activity level for each of the mirrored logical volumes, and maximizing separation of the logical volumes using a matching algorithm to minimize seek times for the physical drives. In one aspect, the matching algorithm is a weighted matching algorithm, the weighting depending upon activity level, and in another instance, the matching algorithm is unweighted, matching the logical volumes in order of activity level.

In particular aspects, the method features periodically repeating the determining and maximizing steps for dynamically and periodically updating the logical volume access. The method can feature sorting the activity levels of the volumes before performing the maximizing step, removing from consideration those logical volumes which the matching algorithm associates with a single disk drive, and repeating the maximizing step on the unmatched logical volumes. The repeating step and the removing step can be repeated until either the number of logical volumes is exhausted or a selected threshold is reached. The threshold will typically be based upon an activity level of the sorted logical volumes.

The apparatus of the invention typically resides in a stored computer program, in magnetic memory, the program instituting the steps of collecting statistics describing at least reading data from the mirrored volumes during successive time periods, determining from the statistics an activity level of the mirrored logical volumes, and maximizing separation of the logical volumes using a matching algorithm to more evenly balance the loading of the disk drives and to minimize average seek time for the disk drives. The matching algorithm can be either a weighted or an unweighted matching algorithm. The program further institutes the step of periodically repeating the determining and maximizing steps for dynamically and periodically updating the logical volume mirror policy.

The apparatus of the invention further incorporates a program which institutes the steps of sorting the activity levels of the volumes prior to the maximizing step, removing those logical volumes which the matching algorithm associates with a single physical disk drive, and repeating the maximizing step upon the unmatched logical volumes. When the matching algorithm reaches a point wherein no further matches can be obtained, the program institutes the steps of removing from consideration those logical volumes which have already been matched and repeating the maximizing step on the remaining sorted logical volumes.

In another aspect of the invention, the method and apparatus of the invention provide for removing stress upon any disk adaptor associated with particular physical drive members.

The invention thus advantageously, adaptively selects, using a matching algorithm, the best mirror service policy for at least the most active logical volumes of a system. While this can only occur efficiently with regard to read operations, wherein no change of the data stored on a logical volume is made, the adjustment decreases the seek time within which data is recalled from a physical drive. The method and apparatus also advantageously better balance the load across the system by determining which disk drives have the highest level of activity and choosing policies to alleviate any existing high load conditions.

BRIEF DESCRIPTION OF THE DRAWINGS

Other features and advantages of the invention will be apparent from the following description taken together with the drawings in which.

DESCRIPTION OF PREFERRED PARTICULAR EMBODIMENTS

Figure 1:
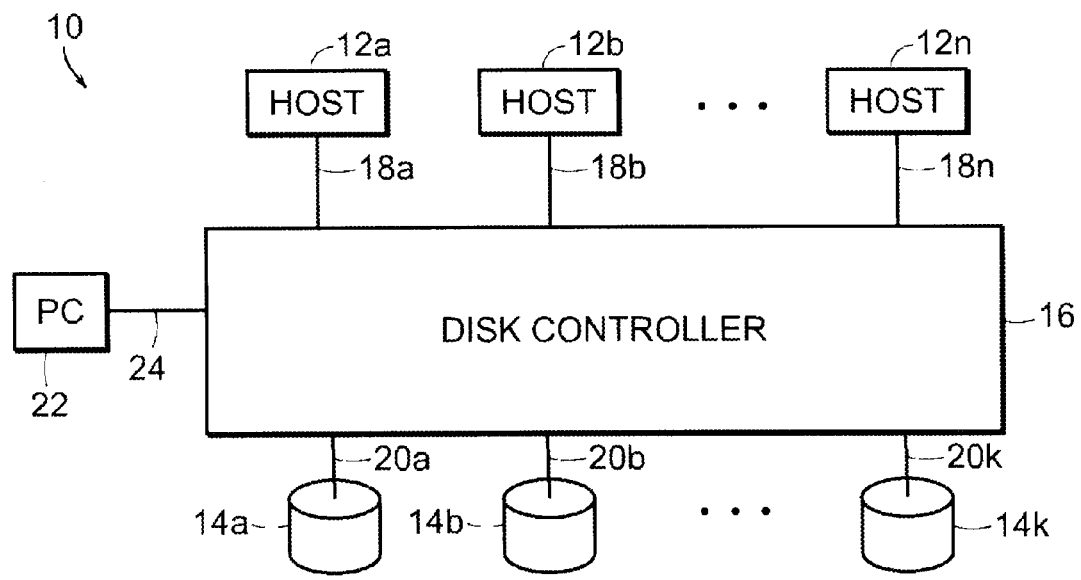
FIG. 1 is a schematic block diagram of a system in which the invention can be employed.

Referring to FIG. 1, the invention relates to a storage system 10 which receives data and commands from, and delivers data and responses to, a plurality of host computers 12a, 12b, . . . , 12n. The storage system 10 is a mass storage system having a disk drive controller 16 and a plurality of disk drive elements 14a, 14b, . . . , 14k. The controller 16 interconnects the host computers 12 and the disk drive elements 14, and can be, for example, that made by EMC and known as the Symmetrix controller. The disk drive controller 16 thus receives memory write commands from the various host computers over buses 18a, 18b, . . . , 18n, respectively, for example, connected and operated in accordance with a SCSI protocol, and delivers the data associated with those commands to the appropriate disk drive elements 14 over respective connecting buses 20a, 20b, . . . 20k. Buses 20 also preferably operate in accordance with a SCSI protocol. The controller also receives read commands from the host computers over buses 18, and delivers requested data to the computer, either from a cache memory of the controller or, if the data is not available in cache memory, from the disk drive elements.

Each of the disk drive elements 14 typically has in excess of nine gigabytes of storage and is logically divided, in accordance with known techniques, into a plurality of units. While typically one unit represents a logical volume, when a logical volume is striped across several disk drives, a unit will store only a fraction of a logical volume. Each disk drive element 14 can thus have a plurality of units, for example 4, 8, or more units on a single disk drive element. In a typical configuration, the controller system also connects to a console PC 22 through a connecting bus 24. Console PC 22 is used for maintenance and access to the controller and can be employed to set parameters of the controller as is well known in the art.

Figure 2:
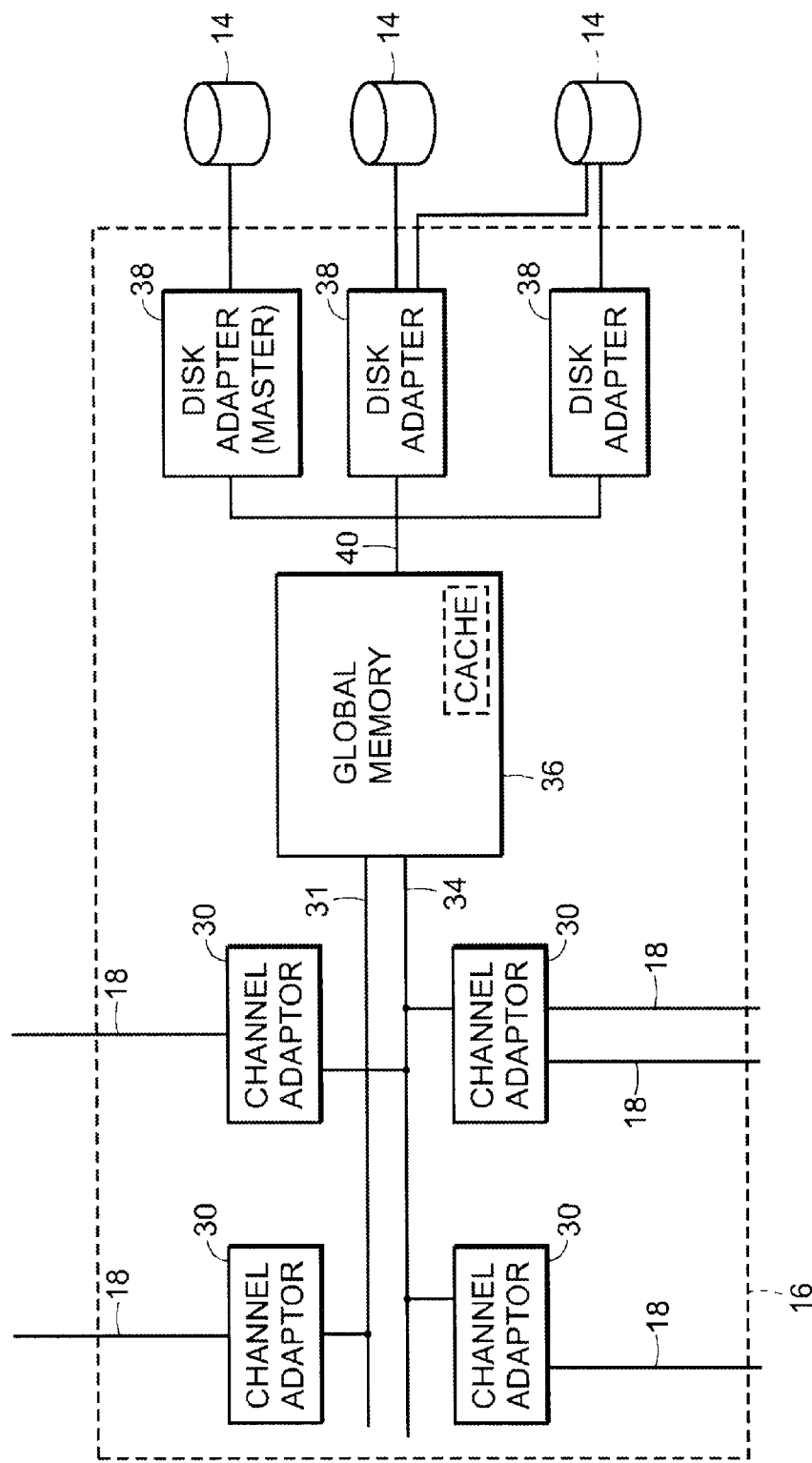
FIG. 2 is a more detailed schematic block diagram of an exemplary disk controller system.

In operation, the host computers 12a, 12b, . . . send, as required by the applications they are running, commands to the mass storage devices requesting data stored in the logical volumes or providing data to be written to the logical volumes. Referring to FIG. 2, and using the EMC Symmetrix controller as an illustrative example, the communications from the host computer typically connects to a port of a plurality of channel directors 30 over the SCSI bus lines 18. Each channel director, in turn, connects over one or more system busses 32 or 34 to a global memory 36. The global memory is preferably a large memory through which the channel directors can communicate to the disk drives and can include the controller's cache memory. Also connected to the global memory are a plurality of disk directors or disk adapters 38 which control the disk drive elements 14. The disk adapters also communicate with the global memory 36 over, preferably, SCSI busses 40.

In accordance with the invention, the disk adapters can read data from the global memory and write it to the logical volumes for which they are responsible, and read data, in response to a read command, from a logical volume and write that data to global memory for later delivery by the channel adaptor to the requesting host.

In a configuration wherein multiple copies of a logical volume are maintained, that is, in particular, where two copies of data are separately stored in two different logical volumes, it is said that mirror copies are maintained. (There can, in other embodiments of the invention, be more than two mirrored copies, for example, there can be four or more mirrored copies. Typically, for purposes of this embodiment, paired copies are employed and it is assumed that each unit stores a logical volume). The controller can then respond to a read request by reading from either of the copies stored in the disk elements. Accordingly, there is implemented in the disk controller, and among the disk adapters, a mirror service policy which identifies which of the adapters is primarily responsible for reading in response to requests from a host computer. This policy could be fixed at the beginning of a system set up, taking into account the expected loads, however, in accordance with the preferred embodiment of the invention, there is provided a dynamic mirror service policy implementation in which the service policy can be modified, periodically, in response to statistics describing the nature of the read and write requests to the mass storage system, to change the mirror service policy periodically during the operation of the storage system.

A dynamic mirror service policy (DMSP) is described in the above-referenced co-pending U.S. Application Ser. No. 08/936,122, now U.S. Pat. No. 6,112,257, and uses the advantages of the static mirror service policies, but provides significant advantages, not previously available or contemplated, but addressing their limitations and making periodic adjustments to the selected policies. Over a given time period, data access information is collected; and at the end of the period, a decision is made for each logical volume about the best policy to use for it. Logical volumes with higher access rates get more preferential treatment than volumes with lower access rates. The information collected includes access rates for both read and write operations and how sequential the accesses were during the time period. Many factors are included in the policy decisions. These factors include: the activity level of the physical disks (copies) involved, the activity level of the disk storage directors involved, how sequential the accesses were, and the relationships between the different host addressable volumes that use the same mirrored disks. The present invention is directed, in particular, to improving the assignment of service polices to the various units in the mirrored disk system.

Figure 3:
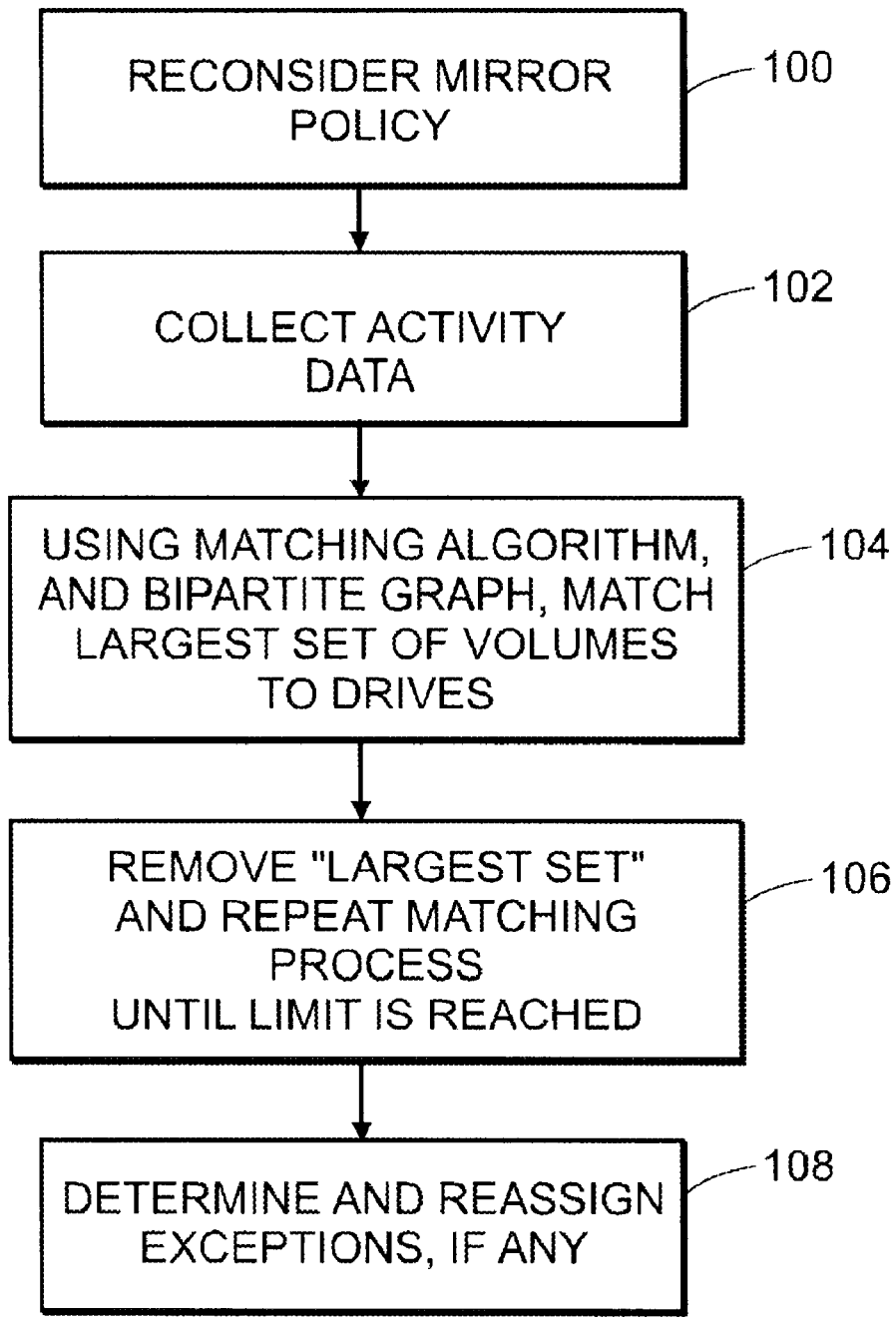
FIG. 3 is a flow diagram illustrating the command flow in accordance with a preferred embodiment of the invention.

In a typical system, the recalculation of the mirror service policies will happen infrequently and is handled as a low priority task in a disk adaptor 38 designated the Master DA. This operation, however, can be spread across multiple disk adapters (DA's) to reduce the performance impact on a single DA. Once the time has come to make a decision on the new policies (step 100 (FIG. 3)), statistics for all logical volumes, which have been collected (step 102) in a table, are reviewed. The logical volumes in this table are thus sorted by activity level (preferably using the approach described in co-pending application Ser. No. 08/936,122 now U.S. Pat. No. 6,112,257) (step 102). Then, using any of the well known methodologies for finding a maximal matching, and binary search, the largest set (beginning with the units having maximum activity) is found for which the bipartite graph of unit occurrences has a matching containing all of the vertices of the largest set (step 104). The "largest set" is removed and the maximum matching process is repeated until a threshold is reached (step 106). In this manner, a decision will be made about which mirror would best service each logical volume (or portion thereof) based on the prior periods' activity levels for the physical devices and disk adapters that service that logical volume. Once this "best mirror" decision has been made for all logical volumes (step 106) consistent with the decisions, with, perhaps, a couple of exceptions (step 108). Among the decision criteria, the system determines if a high ration of sequential I/O operations is detected, in which instance, an interleave policy may be chosen, or if random I/O operations are detected, and there are no other logical volumes that use the same two mirrors, in which case a mix policy can be chosen so that the advantage of having two mirrors is not wasted.

Figure 4:
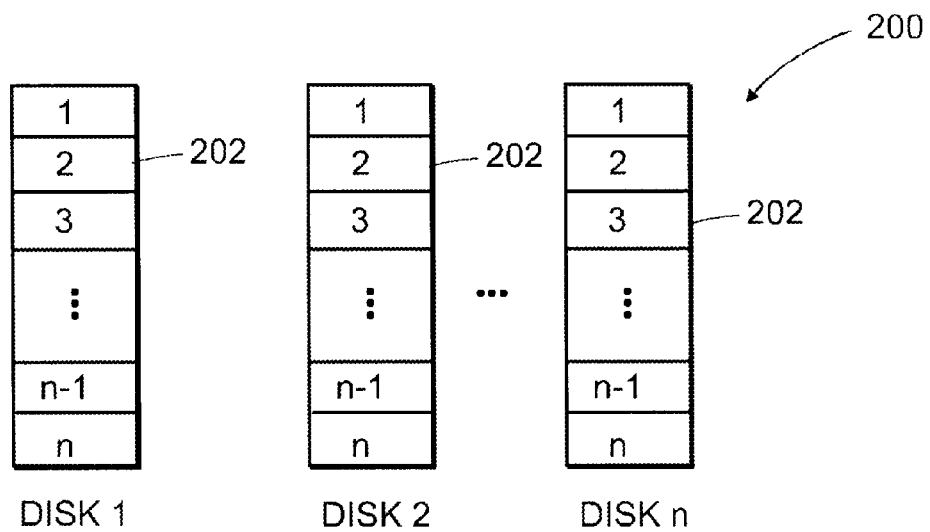
FIG. 4 is an illustration of a typical data storage system divided in accordance with the invention.

Referring to FIG. 4, consider a data storage system 200 consisting of n physical disk drives which are assumed to be identical. The data can be viewed residing on the disk drives as being partitioned into logical units 202 of equal size. Let "h" be the number of units on each disk drive. The data within each unit are logically related. As disk capacity grows the number "h" will tend to grow as well (the number of logical files on each physical disk will grow). Also, if one were to stripe data (as in a RAID system), then the units we consider naturally correspond to the portion of the striped "logical volume" (to use common terminology) which resides on the same physical disk drive. If the stripe width is "s" then "h" will be replaced by "sh". As the number "h" grows, there is a higher probability that 2 or more of the "h" units on a given physical disk will be simultaneously active. Therefore the disk will have to perform many long seeks between the active units, causing it to respond more slowly to user requests. This problem can be referred to as the interference problem.

Assume now that the system is "d" mirrored, that is each unit of data has "d" occurrences. Also assume that the "d" occurrences are randomly placed within the "n" physical disks, subject to the constraint that they have to reside on different disks. (This restriction comes from the role of the mirrored drives to provide failover redundancy, and also from restrictions naturally posed by other possible uses.)

For each logical volume, the mirrored physical unit occurrences are numbered (1, 2, . . . , d). Next, define f(x) as the function which, for a given physical disk, returns the value of the seek time necessary to traverse a distance of the disk defined in terms of a fraction, x, 0<x<1 of the disk. $D_i, \ldots, D_n$ denote the physical discs 1, 2, . . . , n, respectively, and $L_{ij}$ denotes the j'th unit on physical disk $D_i$. Finally, $P_{ij}$ denotes the fraction of activity associated with physical unit j relative to all activity directed towards physical disk $D_i$, that is, for disk $D_i$, what proportion of the disk's read/write activity, is expected to be associated with unit j.

Thus the cumulative seek function for the system is given by $$S(SYSTEM) + \sum_{i=1}^{N} \sum_{j=1}^{h-1} \sum_{k=j+1}^{1} P_{ij} P_{ik} f(k-j)/h) \quad (1)$$

where "h" is the number of physical units on each disk (assumed to be the same for all disks).

While it is desirable to minimize the seek time over all disk drives by solving and minimizing equation one above, no practical approach has been found to enable the solution to be implemented in real time. Nevertheless, several observations can be made from examination of the seek time equation. First, if the disk activity is totally separated by the methodology of the invention, then the seek time will be close to zero, and a call to each different logical volume of the disk drive array will be handled by a different disk drive. Thus, separation refers to a state when no more than one logical volume will be active on a physical drive. While this is clearly a desirable situation, in practice it rarely occurs since the number of units or logical volumes is typically much larger than the number of disk drives.

It is also known that many computer systems tend to either spread disk drive activity in a homogeneous manner, that is, uniformly spread over all of the logical volumes (for example the IBM AS-400 and the TeraData systems are particularly good at this) or the activity tends to be highly skewed, that is, very concentrated on relatively few disk drives. While either of these circumstances, especially the second, can vary in time, and while the highly skewed activity can shift from drive to drive over time, such variations do not occur quickly and can be handled by reviewing the mirror policy over, for example, five minute time intervals. Accordingly, it is possible to cut off the consideration of units (or logical volumes) for a dynamic mirror service policy so that one only looks only at the more active units and does not need to consider those units having "too little activity," that is, activity less than a selected threshold.

In order to provide adequate separation of the activities on various disk drives, and taking into account the observations noted above, the invention contemplates use of matching algorithms, for matching units (logical volumes) to physical drives using a bipartite graph. The problem which is solved is to determine a maximal number of acceptable matches, that is, matches between logical volumes, or units, and physical disks. The solution is to use either a weighted or an unweighted matching algorithm to solve the problem.

A random assignment of units to disks is assumed, subject only to capacity constraints. The amount of disk activity directed to each disk unit during an interval T (for example five minutes), is then monitored and accumulated. The different activities, such as reads and sequential prefetched reads, have to be weighted to reflect the relative strain that they impose on the disk (for example sequential reads are more efficient than regular reads). If writes are considered, they are typically given a lower weight because they can be better controlled, and timed, using a write buffer.

The units are sorted by total weighted activity (as noted above and in U.S. Application Ser. No. 08/936,122), say $u_1, \ldots, u_{n-h/d}$. Using any of the well known algorithms for finding a maximal matching, the largest set, U, of the form $(u_1 \ldots, u_m)$ for which the bipartite graph of unit occurrences has a match which contains all the vertices of U (that is a matching having a set of distinct representatives (SDR matching) is found). The set $\{u_1 \ldots u_m\}$ is removed from the sorted list and the process is repeated.

Figure 5:
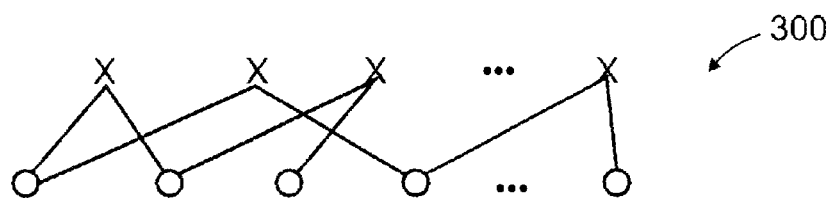
FIG. 5 is a bipartite graph illustrating an unweighted matching.

In particular, then, referring to FIG. 5, if "x" represents logical volumes or units, and "o" represents physical drives, and further assuming that we are in a situation where there is only double mirroring (that is a logical volume is stored on two physical drives only), the initial graph, 300, illustrates a structure where each logical volume is associated with two physical drives. This is illustrated diagrammatically in FIG. 5.

The matching problem is then, given the initial structure or conditions, to find (or match) for each logical volume a physical drive so that only one logical volume is associated with (from an activity perspective is tied to) only one physical drive. The object of the matching algorithm (an example which can be found in "An Analysis of Alternative Strategies For Implementing Matching Algorithms" by Ball and Derigs, NETWORKS, Volume 13 (1983)) (pages 517–549) is to find the maximum separation for as large as possible a set of the logical units having the largest activity.

In an alternate approach, when write operations are to be considered, the write operations, during the sorting step, are weighted with a smaller weighting factor to reflect the write buffering. A limit factor is then set, and all weighted writes less than the limit factor or threshold are ignored. For those writes above the limit factor, or threshold, the disks being written to are flagged; and when the matching algorithm is preformed, those disks with the higher number of writes are withdrawn from consideration. That is, matching only occurs where the weighted write activity is below some selected threshold.

Accordingly, in operation, the logical volumes are first sorted by activity, for example, as described in co-pending application U.S. Ser. No. 08/936,122, now U.S. Pat. No. 6,112,257, noted above, and as many of those logical volumes are matched, using either an unweighted or weighed matching algorithm, as possible. It is important to note that the matching algorithm methodology is extendable, that is, if one has three "matches" the fourth match can be easily obtained, if it is possible, by an extension of the original three matches. Accordingly, for an unweighted matching the methodology matches the logical volumes, in order of activity, assuming that all activity will be associated with only one of the mirrored copies. The matching continues, in order of activity until a next, unmatched volume, cannot be matched.

As noted above, in accordance with the invention, once the separation matching is performed, to the extent possible, those matched units or logical volumes are separated or removed from the rest of the logical volumes stored on the disk drive array and the so-called remainder is then matched, to the extent possible. This process is repeated until all of the logical volumes are exhausted, or, until the process reaches a set threshold of minimum activity beyond which the matching process is not performed.

Figure 6:
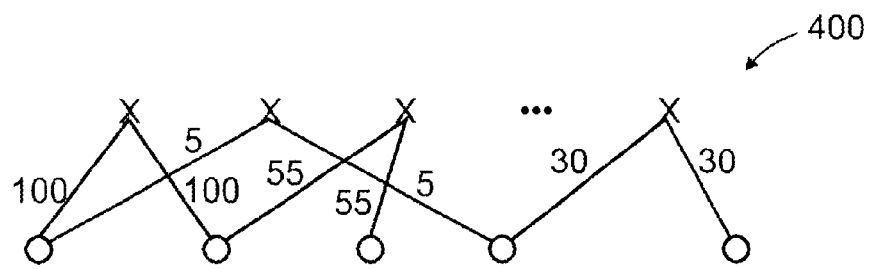
FIG. 6 is a bipartite graph illustrating matching using a weighted matching algorithm.

Referring now to FIG. 6, in accordance with another aspect of the invention, a weighted matching can be performed. In accordance with this aspect of the invention, the activity numbers associated with each of the logical volumes is attached to the "edge" in the bipartite graph 400 (as illustrated) and the matching algorithm finds a maximal weighted matching, that is, the method separates the largest amount of activity that is possible. In this aspect of the invention, therefore, there is a combination of minimizing the seeks while maximizing the activity being separated. As with the unweighted process, once the initial match is performed to the extent possible, the matched volumes are removed and the process continues. The removal and continuation sequence continues until either a threshold is reached or all volumes are matched. possible, the matched volumes are removed and the process continues. The removal and continuation sequence continues until either a threshold is reached or all volumes are matched.

According to the invention, therefore, for a system having 128 physical drives, the use of matching algorithms to effect separation and minimize the seek function can be employed for, typically, up to about 90 units (considering reads only). This is a distinct improvement over the particular dynamic mirror service policy illustrated in U.S. application Ser. No. 08/936,122, now U.S. Pat. No. 6,112,257, which can separate approximately 56 unites (considering reads only). Accordingly, the matching algorithm approach to separation enables significant advantages over the systems which have been previously employed. (Note that if writes are considered, the performance of both systems decreases, although the method of the present invention continues to perform better.)

As noted above, the operation, according to the invention, will be controlled by one disk director that is the master. In the event of a failure of the master director, a designated back-up director will be responsible for the operation of the system.

As noted above, the mirror service policy decision operation will be executed as a very low priority background task, for example, implemented every ten minutes. After execution of the decision process begins, the process can be executed in fragments so there is no significant time during which the master disk director is unavailable to process incoming requests. The fragment size (if needed) can be selectable and will be determined, for example, in terms of how many logical volumes to examine before resuming, temporarily, normal disk adaptor operation.

Attached as Appendix A is a source code program written in "C" to implement the unweighted matching algorithm according to the invention (and assuming no writes).

Additions, subtractions, and other modifications of the preferred embodiments of the invention will be apparent to those practiced in this field and are within the scope of the following claims.

What is claimed is:

1. A method for dynamically adjusting the loading in a system of physical disk drives for at least reading mirrored logical volumes comprising the steps of:
   collecting statistics describing at least reading data from said mirrored logical volumes during successive time periods;
   determining from said statistics an activity level of said mirrored logical volumes, and
   using said activity levels, maximizing separation of said mirrored logical volumes in general order of activity using a matching algorithm, which is for obtaining a maximal number of matches between said mirrored logical volumes and said physical disk drives, to minimize seek times for said physical drives.

2. The method of claim 1 further comprising the step of:
   periodically repeating the determining and maximizing steps for dynamically and periodically updating the access to said logical mirrored volumes.

3. The method of claim 2 further wherein said collecting step comprises the steps of:
   collecting statistics describing, for each logical volume:
      the number of reads in a last time period,
      the number of writes in the last time period, and
      the percentage of input/output operations in the last time period that were sequential.

4. The method of claim 1 further comprising the steps of:
   sorting the activity levels of said volumes prior to said maximizing step,
   removing from consideration those logical volumes which the matching algorithm matches to a single physical disk drive, and
   repeating said maximizing step upon the unmatched logical volumes.

5. The method of claim 4 further comprising the step of:
   repeating said removing and repeating steps until a selected threshold is reached.

6. The method of claim 5 wherein said selected threshold is based upon an activity level for said sorted logical volumes.

7. The method of claim 1 wherein said maximizing step employs a weighted matching algorithm based upon activity levels of said logical volumes as the weighting factor.

8. The method of claim 1 wherein said maximizing steps employs an unweighted matching algorithm.

9. An apparatus for dynamically adjusting a mirror service for a plurality of physical disk devices, each device controlled by one of a plurality of disk adapters comprising:
   a stored computer program in magnetic memory instituting the steps of:
      collecting statistics describing at least reading data from mirrored logical volumes in said physical disk devices during successive time periods,
      determining from said statistics an activity level of said mirrored logical volumes, and
      using said activity levels, maximizing separation of said logical volumes in general order of activity using a matching algorithm to obtain a maximal number of matches between said mirrored logical volumes and said physical disk drive to more evenly balance the loading of said disk drives and to minimize average seek time for said disk drives.

10. The apparatus of claim 9 further wherein said program institutes the step of:

periodically repeating the determining and maximizing steps for dynamically and periodically updating the mirror service policy.

11. The apparatus of claim 10 further wherein said program instituted collecting step comprising the step of:

collecting statistics describing, for each logical volume,
the number of reads in a last time period,
the number of writes in the last time period, and
the percentage of input/output operations in the last time period that were sequential.

12. The apparatus of claim 9 further wherein said program institutes the steps of:

sorting the activity levels of said volumes prior to said maximizing step, removing from consideration those logical volumes which the matching algorithm matches to a single physical disk drive, and repeating said maximizing steps upon the unmatched logical volumes.

13. The apparatus of claim 12 further wherein said program institutes the step of:

repeating said removing and repeating steps until a selected threshold is reached.

14. The apparatus of claim 13 wherein said selected threshold is based upon an activity level for said sorted logical volumes.

15. The apparatus of claim 9 wherein said program instituted maximizing step employs a weighted matching algorithms based upon activity levels of said logical volumes as the weighting factor.

16. The apparatus of claim 9 wherein said program instituted maximizing step employs an unweighted matching algorithm.

17. An apparatus for dynamically adjusting a mirror service policy for a plurality of physical disk devices, each device controlled by one of a plurality of disk adapters comprising:

a stored computer program in magnetic memory instituting the steps of:

collecting statistics describing at least reading data from mirrored logical volumes in said physical disk devices during successive time periods, determining from said statistics an activity level of said local volumes and said disk adapters based on said mirrored logical volumes, and using said activity levels, dynamically maximizing separation of said mirrored logical volumes in general order of activity using a matching algorithm to obtain a maximal number of matches between said mirrored logical volumes and said physical disk drives at least in part to more evenly balance the loading of said disk drives.

18. The apparatus of claim 17 further wherein said mirrored logical volumes comprise groups of two logical volumes.

19. The apparatus of claim 17 further wherein said program institutes the steps of:

sorting the activity levels of said volumes prior to said maximizing step, removing from consideration those logical volumes which the matching algorithm matches to a single physical disk drive, and repeating said maximizing step upon the unmatched logical volumes.

20. The apparatus of claim 19 further wherein said program institutes the step of:

repeating said removing and repeating steps until a selected threshold is reached.

21. The apparatus of claim 20 wherein said selected threshold is based upon an activity level for said sorted logical volumes.

22. The apparatus of claim 17 wherein said program instituted maximizing step employs a weighted matching algorithm based upon activity levels of said logical volumes as the weighting factor.

23. The apparatus of claim 17 wherein said program instituted maximizing step employs an unweighted matching algorithm.

24. A method for dynamically adjusting the loading in a system of physical disk drives for reading and writing mirrored logical volumes comprising the steps of:

collecting statistics describing at least reading data from said mirrored logical volumes during successive time periods, determining from said statistics an activity level of said mirrored logical volumes in said system based on reading and accessing said mirrored logical volumes, and using said activity levels, dynamically maximizing separation of said mirrored logical volumes in general order of activity using a matching algorithm, which is for obtaining a maximal number of matches between said mirrored logical volumes and said physical disk drives, to more evenly balance the loading in reading and accessing of said volumes.

25. The method of claim 24 further comprising the steps of:

sorting the activity levels of said volumes prior to said maximizing step, removing from consideration those logical volumes which the matching algorithm matches to a single physical disk drive, and repeating said maximizing step upon the unmatched logical volumes.

26. The method of claim 25 further comprising the step of:

repeating said removing and repeating steps until a selected threshold is reached.

27. The method of claim 26 wherein said selected threshold is based upon an activity level for said sorted logical volumes.

28. The method of claim 24 wherein said maximizing steps employs a weighted matching algorithm based upon activity levels of said logical volumes as the weighting factor.

29. The method of claim 24 wherein said maximizing steps employs an unweighted matching algorithm.

30. The method of claim 24 further comprising the steps of:

collecting statistics describing writing data from a write buffer during said time periods, weighting said collected write data to generate write activity levels, ignoring weighted write activity levels below a selected threshold, and including the remaining weighted write activity level data in said separation maximizing step.

* * * * *